United States Patent
Agarwal et al.

(10) Patent No.: US 10,642,267 B2
(45) Date of Patent: May 5, 2020

(54) AUTOMATED VEHICLE SYSTEM AND METHOD FOR CHANGING FROM AUTOMATED-MODE TO MANUAL-MODE NEAR A CONSTRUCTION-ZONE

(71) Applicant: Aptiv Technologies Limited, St. Michael (BB)

(72) Inventors: Divya Agarwal, Sunnyvale, CA (US); Michael H. Laur, Mission Viejo, CA (US); Brian R. Hilnbrand, Mountain View, CA (US)

(73) Assignee: Aptiv Technologies Limited (BB)

( * ) Notice: Subject to any disclaimer, the term of this patent is extended or adjusted under 35 U.S.C. 154(b) by 162 days.

(21) Appl. No.: 15/858,148

(22) Filed: Dec. 29, 2017

(65) Prior Publication Data
US 2019/0196466 A1    Jun. 27, 2019

Related U.S. Application Data

(60) Provisional application No. 62/609,652, filed on Dec. 22, 2017.

(51) Int. Cl.
*G08G 1/01*    (2006.01)
*G08B 1/08*    (2006.01)
(Continued)

(52) U.S. Cl.
CPC .......... *G05D 1/0061* (2013.01); *B60W 40/06* (2013.01); *B60W 50/14* (2013.01);
(Continued)

(58) Field of Classification Search
CPC ................. G05D 1/0061; B60W 40/06; B60W 2550/402; B60W 2420/52
(Continued)

(56) References Cited

U.S. PATENT DOCUMENTS 8,095,290 B2 * 1/2012 Smyth ................... B60W 10/06
                                                    701/102
8,605,947 B2 * 12/2013 Zhang ................ G06K 9/00798
                                                    348/116
(Continued)

FOREIGN PATENT DOCUMENTS

CN        105210128 A  * 12/2015   ......... G06K 9/00818
DE   10 2015 014139 A1     5/2017
(Continued)

OTHER PUBLICATIONS

European Search Report for application No. 18209945, European Patent Office, dated Apr. 30, 2019.

*Primary Examiner* — Cuong H Nguyen
(74) *Attorney, Agent, or Firm* — Joseph V. Bonadies

(57) ABSTRACT

A system and method for operating an automated vehicle includes providing a detector and a controller-circuit. The detector is configured to detect construction-objects. The controller-circuit is configured to, in accordance with a detection of a construction-object by the detector, determine that a host-vehicle is proximate to a construction-zone. The controller-circuit and the method is also configured to, in accordance with a determination that the host-vehicle is proximate the construction-zone, change control of the host-vehicle from an automated-mode characterized by the controller-circuit steering the host-vehicle to a manual-mode characterized by an occupant of the host-vehicle steering the host-vehicle.

19 Claims, 3 Drawing Sheets

(51) Int. Cl.
  *G05D 1/00* (2006.01)
  *B60W 50/14* (2020.01)
  *B60W 40/06* (2012.01)

(52) U.S. Cl.
  CPC ..... *B60W 2420/42* (2013.01); *B60W 2420/52* (2013.01); *B60W 2550/141* (2013.01); *B60W 2550/22* (2013.01); *B60W 2550/402* (2013.01)

(58) Field of Classification Search
  USPC ..................................... 701/53, 36; 340/435
  See application file for complete search history.

(56) References Cited

U.S. PATENT DOCUMENTS

| | | | | |
|---|---|---|---|---|
| 8,818,618 B2* | 8/2014 | Follmer | ................ | G06Q 10/10 701/33.4 |
| 8,996,286 B1* | 3/2015 | Klein | ................ | G01C 21/3415 701/117 |
| 9,141,107 B2* | 9/2015 | Ferguson | ................ | G06K 9/00 |
| 9,193,355 B2* | 11/2015 | Ferguson | ........... | G08G 1/09623 |
| 9,199,641 B2* | 12/2015 | Ferguson | ........... | G01C 21/3461 |
| 2005/0267658 A1* | 12/2005 | Yuan | ................... | B60W 30/146 701/36 |
| 2010/0104199 A1* | 4/2010 | Zhang | ................ | G06K 9/00798 382/199 |
| 2014/0063232 A1* | 3/2014 | Fairfield | ........... | G06K 9/00798 348/118 |
| 2014/0309833 A1* | 10/2014 | Ferguson | ............ | G05D 1/0088 701/23 |
| 2016/0200326 A1* | 7/2016 | Cullinane | ............ | B60W 30/00 701/23 |
| 2017/0235307 A1* | 8/2017 | Asakura | ............. | B60W 40/12 701/23 |
| 2018/0151066 A1* | 5/2018 | Oba | ................ | G08G 1/096725 |
| 2018/0326985 A1* | 11/2018 | Hermann | ............ | B60W 50/14 |

FOREIGN PATENT DOCUMENTS

| | | | | | |
|---|---|---|---|---|---|
| EP | 2984642 A1 | * | 2/2016 | ............ | G01C 21/32 |
| JP | 2017191617 A | * | 10/2017 | ........... | G05D 1/0088 |
| JP | 2018154338 A | * | 10/2018 | ............ | G01C 21/32 |
| WO | WO-2014168944 A1 | * | 10/2014 | ............ | G01C 21/26 |

* cited by examiner

AUTOMATED VEHICLE SYSTEM AND METHOD FOR CHANGING FROM AUTOMATED-MODE TO MANUAL-MODE NEAR A CONSTRUCTION-ZONE

TECHNICAL FIELD OF INVENTION

This disclosure generally relates to a system and method for operating an automated vehicle, and more particularly relates to changing control of a host-vehicle from an automated-mode characterized by a controller-circuit steering the host-vehicle to a manual-mode characterized by an occupant of the host-vehicle steering the host-vehicle when the host-vehicle is near a construction-zone.

BRIEF DESCRIPTION OF DRAWINGS

The present invention will now be described, by way of example with reference to the accompanying drawings, in which.

DETAILED DESCRIPTION

Figure 1:
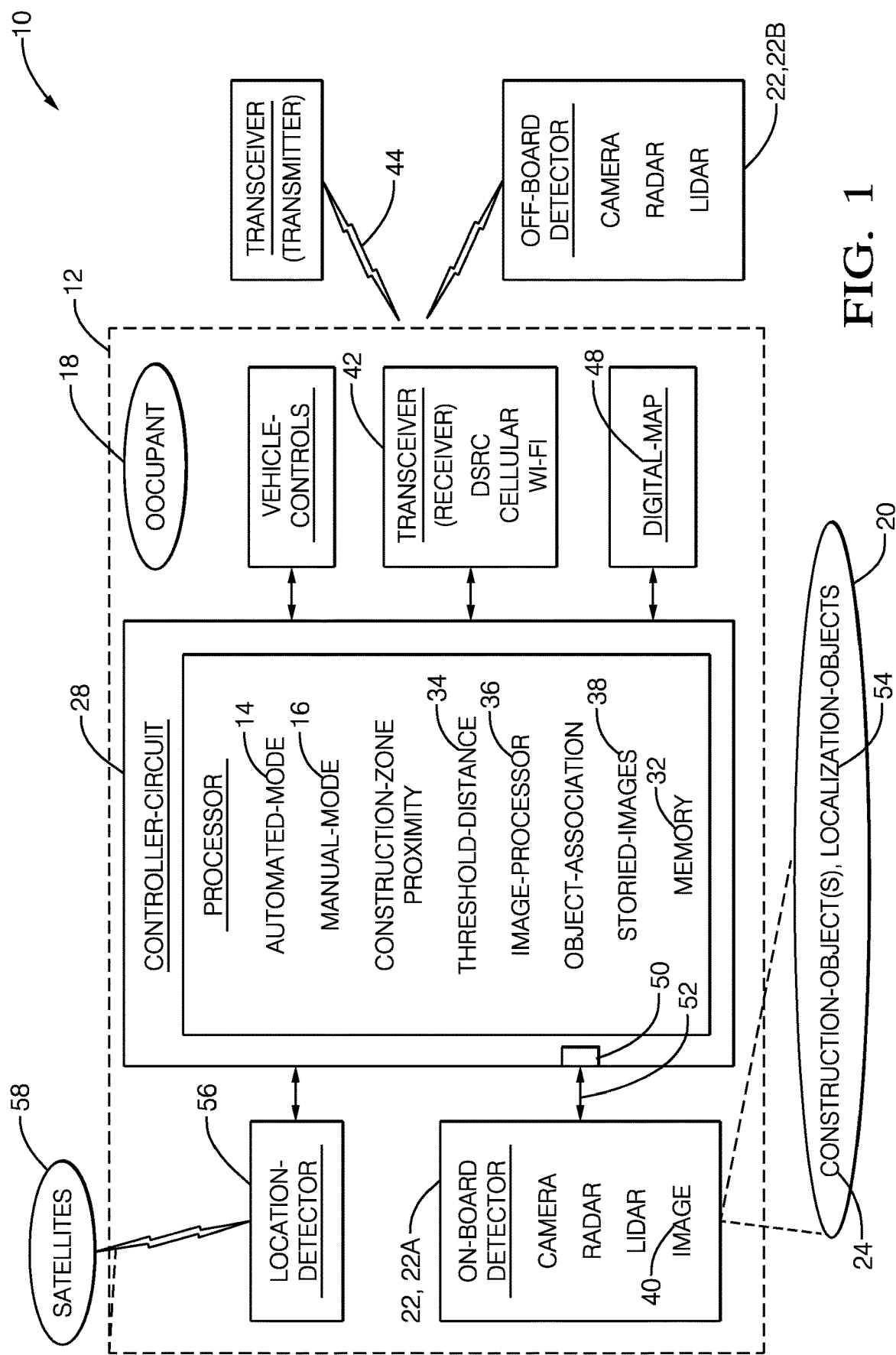
FIG. 1 is a diagram of a system for operating an automated vehicle in accordance with one embodiment.

FIG. 1 illustrates a non-limiting example of a system 10 for operating an automated vehicle 12, hereafter referred to as the host-vehicle 12. As used herein, the term automated vehicle may apply to instances when the host-vehicle 12 is being operated in an automated-mode 14, i.e. a fully autonomous mode, where an occupant 18 (i.e. human-operator) of the host-vehicle 12 may do little more than designate a destination to operate the host-vehicle 12. However, full automation is not a requirement. It is contemplated that the teachings presented herein are useful when the host-vehicle 12 is operated in a semi-automated or manual-mode 16 where the degree or level of automation may include steering the host-vehicle 12, but may be little more than providing an audible or visual warning to the human-operator who is generally in control of the steering, accelerator, and brakes of the host-vehicle 12. For example, the system 10 may merely assist the human-operator (i.e. the occupant 18) as needed to navigate a construction-zone to avoid interference with and/or a collision with, for example, an object such as a construction barrier or construction equipment.

The system 10 includes a detector 22 configured to, or used to, detect a variety of objects, including but not limited to, instances of construction-objects 24. The detector 22 may include or be formed of, but is not limited to, one or more instances of a camera, a radar, a lidar, or any combination thereof, as will be recognized by those in the perception sensor arts. The detector 22 may consist of or may include an on-board detector 22A mounted on the host-vehicle 12 and/or an off-board detector 22B located remote from the host-vehicle 12. That is, information used to determine the presence of objects proximate to the host-vehicle 12 may be provided exclusively by the on-board detector 22A, or exclusively by the off-board detector 22B or by a combination of the on-board detector 22A and the off-board detector 22B. The off-board detector 22B may be part of infrastructure, a traffic-camera for example.

Figure 2:
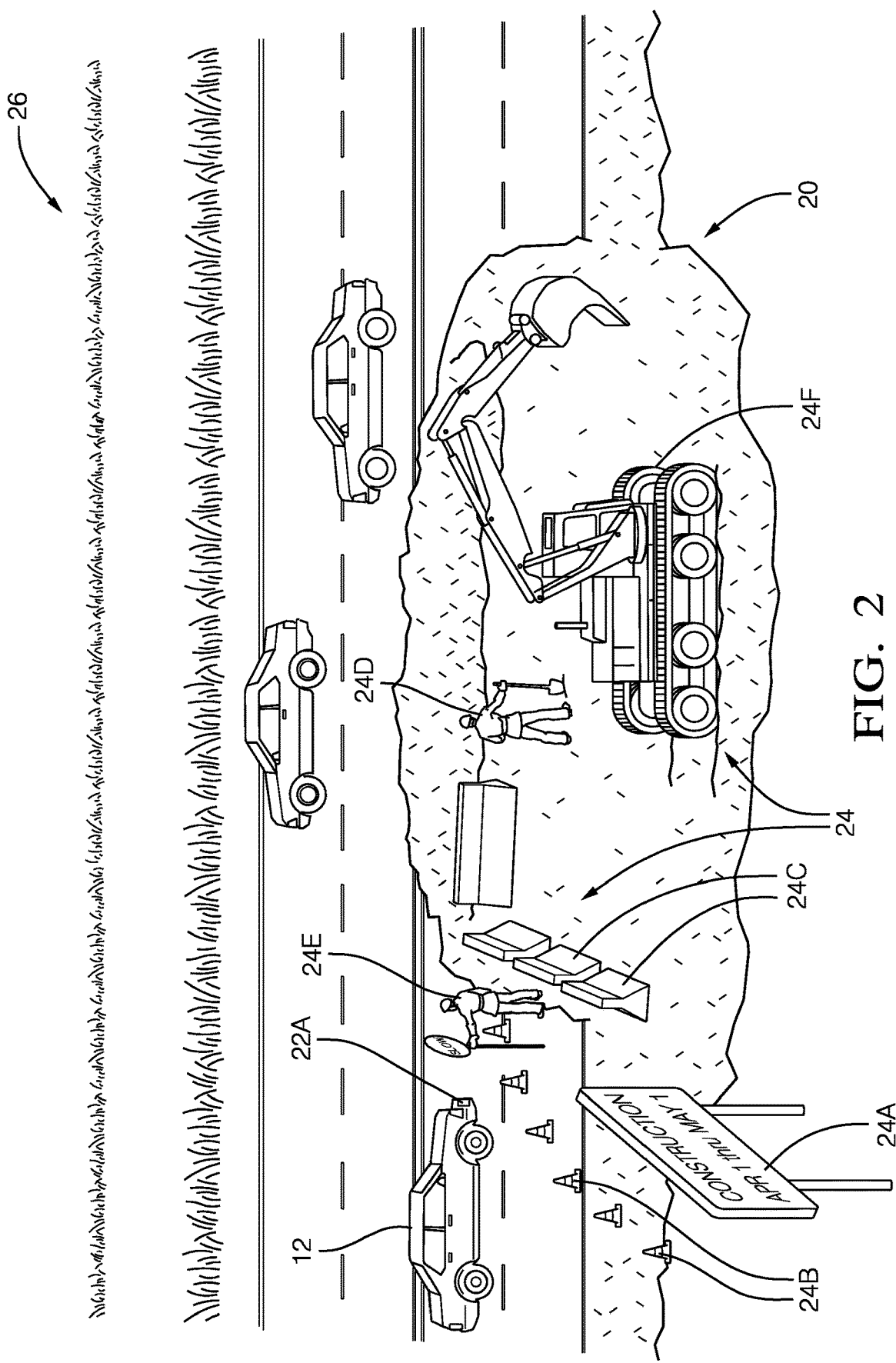
FIG. 2 is a scenario encountered by the system of FIG. 1 in accordance with one embodiment.

FIG. 2 illustrates a non-limiting example of a scenario 26 encountered by the host-vehicle 12 that illustrates non-limiting examples of the construction-objects 24 that may be present at or near the construction-zone 20 and can be detected by the detector 22. By way of example and not limitation, the construction-objects 24 may include, but are not limited to: a reconfigurable information-sign 24A that may be used to indicate, for example, the expected dates of start and finish of construction, a traffic-cone 24B; a barricade 24C; a construction worker 24D (holding a shovel); a person 24E wearing hard-hat and/or vest and/or holding a reversible stop/slow sign; and/or construction equipment 24F. While not shown, it is contemplated that other objects located remote from the construction-zone 20 may also be indicative of the host-vehicle 12 approaching the construction zone; a construction-ahead sign or a detour-sign, for example.

Returning to FIG. 1, the system 10 includes a controller-circuit 28, which may be referred to elsewhere herein as the controller 28. The controller 28 may include a processor 30 such as a microprocessor or other control circuitry such as analog and/or digital control circuitry including an application specific integrated circuit (ASIC) for processing data as should be evident to those in the art. Hereafter, any reference to the controller 28 being configured for capability is to be also interpreted as suggesting that the processor 30 may also be configured for the same capability, unless indicated otherwise. The controller 28 or the processor 30 may include an input 50 configured to receive a signal 52 from the detector 22. The controller 28 may include memory 32, i.e. non-transitory computer-readable storage medium, including non-volatile memory, such as electrically erasable programmable read-only memory (EEPROM) for storing one or more routines, thresholds, and captured data. The memory 32 may be part of the processor 30, or part of the controller 28, or separate from the controller 28 such as remote memory stored in the cloud.

The one or more routines may be executed by the controller 28 or the processor 30 to perform steps to determine if the host-vehicle 12 is at or is approaching the construction-zone 20 based on signals received by the controller 28 as described elsewhere herein. That is, the controller 28 or the processor 30 is configured to, in accordance with a detection of one or more instances of the construction-objects 24 by the detector 22, determine that a host-vehicle 12 is proximate to the construction-zone 20. As used herein, the host-vehicle 12 is deemed to be proximate to the construction-zone 20 when it becomes preferable for the occupant 18 to operate (e.g. steer) the host-vehicle 12 rather than the controller 28, i.e. it is preferable to operate the host-vehicle 12 in the manual-mode 16 rather than the automated-mode 14. For example, the determination that the host-vehicle 12 is proximate the construction-zone 20 may be based on or may be in accordance with a determination that the host-vehicle 12 is closer than a threshold-distance 34 two-hundred-meters (200 m) to the construction-zone 20. That is, the host-vehicle 12 may be deemed to be proximate to the construction-zone 20 when the host-vehicle 12 is less than two-hundred-meters (<200 m) away from the closest edge of the construction-zone 20.

In accordance with a determination that the host-vehicle 12 is proximate the construction-zone 20, the controller 28 is configured to change control of the host-vehicle 12 from the automated-mode 14, which is characterized by the controller-circuit 28 steering and/or operating the accelerator/brakes of the host-vehicle, to the manual-mode 16, which is characterized by the occupant 18 of the host-vehicle 12 steering and/or operating accelerator/brakes of the host-vehicle 12. That is, if it is determined by the controller 28 that the host-vehicle 12 is at or close to the construction-zone 20, the controller 28 forces or attempts to force a change in the mode of operation from the automated-mode 14 to the manual-mode 16, whereby the occupant 18 (e.g. a human operator) takes control of the host-vehicle 12 to navigate through or around the construction-zone 20. It is contemplated that while in the manual-mode 16, safety features such as automated brakes and/or other crash-avoidance related features will still be enabled on the host-vehicle 12. It is also contemplated that circumstances may arise where the occupant 18 is unable to take control of the host-vehicle 12 and some alternative to continuing to operate in a driver-less manner (i.e. the automated-mode 14) may be necessary. These alternatives for operating the host-vehicle 12 when the occupant 18 is incapacitated have been suggested in other patent documents so will not be discussed here.

To determine if/when the host-vehicle 12 is proximate to or approaching a construction-zone, the system 10 needs to determine if/when an object detected by the detector 22 is an instance of the construction-objects 24, i.e. that object is the construction-object 24 and is thereby associated with construction-zones. Accordingly, the controller 28 or the processor 30 may include an image-processor 36 configured to perform object-association by comparing an image 40 from the detector 22 to one or more instances of stored-images 38. As used herein, the image 40 may be comparable to a photograph provided by the camera, a radar-return-map provided by the radar, a point-cloud provided by the lidar, or a hybrid/combination of any two or more of the photograph, radar-return-map, and point-cloud. As will be recognized by those in the object classification arts, the stored-images 38 may include thousands of images, each of which having been previously classified as being associated with an instance of an object that may be found at or near the construction-zone 20.

By way of example and not limitation, and as mentioned above, the construction-object 24 may be one or more of a construction-sign 24A, a traffic-cone 24B, a barricade 24C, a construction-worker 24D, a person holding a stop/slow sign, and/or construction-equipment 24F such as an excavator, a crane, a dump-truck, a road-grader, or a vehicle deploying the traffic-cones. For each of these examples of the construction-object 24 there may be multiple instances in the stored images that depict a comparable instance of the construction-object from multiple perspectives. It is also contemplated that the image-processor 36 may be configured to perform optical character recognition so the controller 28 can 'read' the construction-sign 24A or the stop/slow sign held by the person 24E.

The system 10 may include a receiver 42 configured to receive a construction-broadcast 44 from a transmitter 46 that may be operated by a government entity or by a construction company working at the construction-zone 20. The receiver 42 and the transmitter 46 may each be part of distinct transceivers such as a dedicated-short-range-communication (DSRC) transceiver or a cellular-network transceiver. The construction-broadcast 44 may include information about the dates/days/time that construction is active, information about detours so the construction-zone 20 can be avoided, and/or coordinates that define boundaries of the construction-zone 20.

The system 10 may include a digital-map 48 that designates the location and/or boundaries of the construction-zone. The digital-map 48 may be located at the host-vehicle 12, e.g. stored in the controller 28, and be periodically (e.g. daily, hourly, etc.) updated, or the digital-map 48 may be stored in the cloud, and possibly accessed by the controller 28 in real-time. It also contemplated that updates to the digital-map 48 that are relevant to the construction-zone 20 may be included in the construction-broadcast 44. That is, the controller-circuit 28 may be configured to access in real-time a local update or local modification of the digital-map 48 that designates the location of the construction-zone 20.

The digital-map 48 may include information regarding the location (i.e. the coordinates) of a localization-object 54. As used herein, the localization-object 54 may be any object whose location is relatively permanent (e.g. not changing on a regular basis and/or not easily moved) and preferably has characteristics that make the detection and classification of the localization-object 54 reliable. Suitable examples of the localization-object 54 include, but are not limited to: a building, a bridge, lane-marking, a roadway/shoulder transition, a traffic-sign, a lamp-post, and a reference-object (an object placed solely for being a localization-object 54). A construction project may temporarily or permanently remove the localization-object 54 from the location indicated in the digital-map 48. Accordingly, the determination that the host-vehicle 12 is proximate the construction-zone 20 may be determined based on or in accordance with a determination that a localization-object 54 indicated in the digital-map 48 is not detected by the detector 22. Alternatively, the determination that the host-vehicle 12 is proximate the construction-zone 20 may be based on or in accordance with a determination that an object-location of a localization-object 54 detected by the detector 22 is not located at a map-location of the localization-object 54 indicated in the digital-map 48 because the localization-object has been moved, possibly only a few meters, due to construction.

Figure 3:
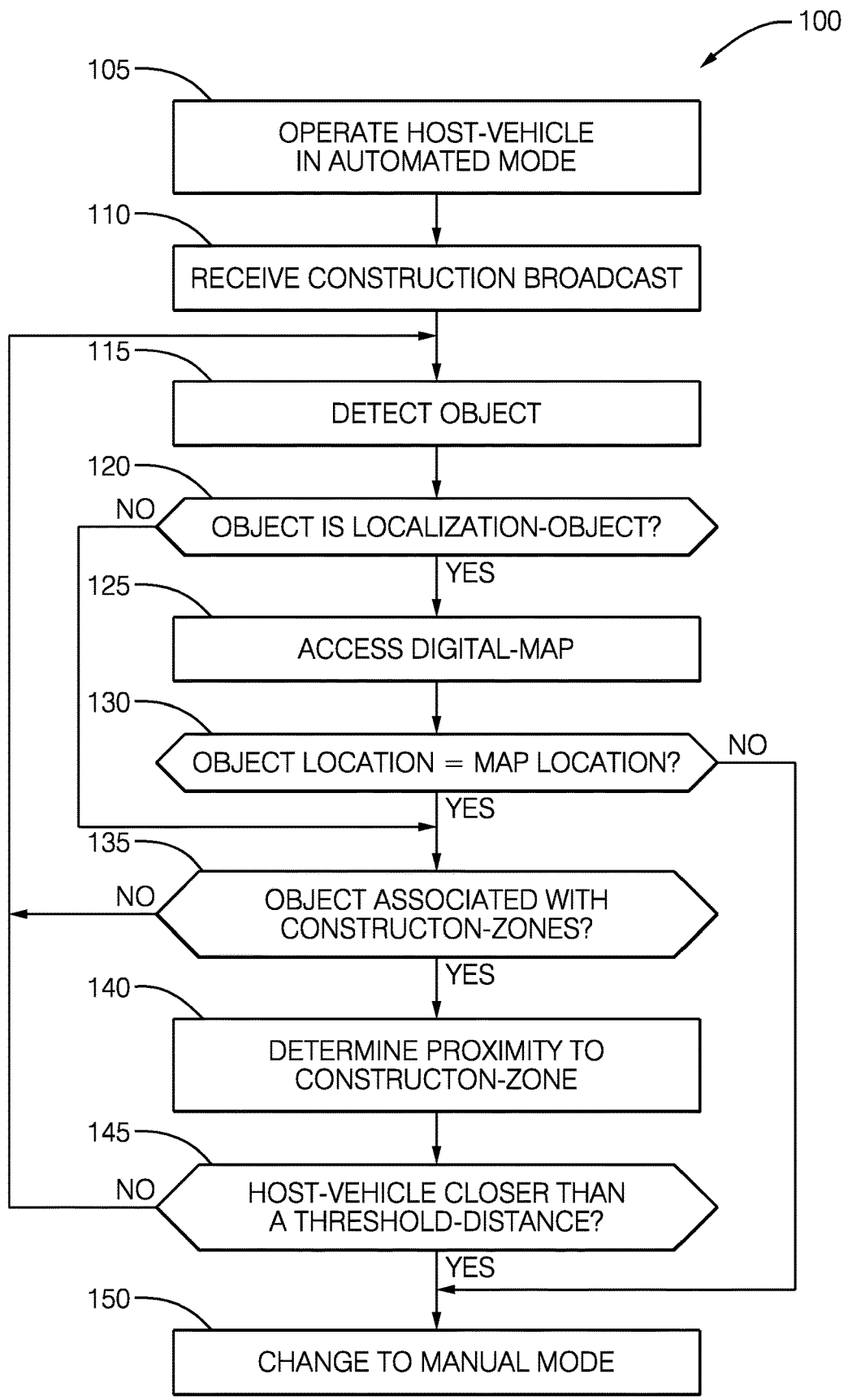
FIG. 3 is a flowchart of a method of operating the system of FIG. 1 in accordance with one embodiment.

FIG. 3 illustrates a non-limiting example of a method 100 for operating an automated vehicle, e.g. the host-vehicle 12. As will be described in more detail below, the method 100 is generally directed to detecting the presence of a construction-zone 20 (FIGS. 1 and 2) nearby (i.e. proximate to) the host-vehicle 12, and transferring control of the host-vehicle 12 from the controller 28 to the occupant 18 of the host-vehicle 12. That is, rather than continue to operate the host-vehicle 12 in the automated-mode 14 (i.e. driverless or fully autonomous operator) while traveling through the construction-zone 20, operational control of the host-vehicle 12 is transferred to the occupant 18, i.e. a human-operator, by changing operation of the host-vehicle 12 to the manual-mode 16.

Step 105, OPERATE HOST-VEHICLE IN AUTOMATED-MODE, may include operating a host-vehicle 12 in an automated-mode 14, which is generally characterized by the controller-circuit 28 or the processor 30 having control of the steering and/or the accelerator/brakes of the host-vehicle 12.

Step 110, RECEIVE CONSTRUCTION-BROADCAST, may include receiving, by the receiver 42, the construction-broadcast 44. The construction-broadcast 44 may include information about the construction-zone 20 such as: the boundaries of the construction-zone 20, suggested detours, possible delay-times, and/or changes in the normal speed-limit while traveling through the construction-zone 20.

Step 115, DETECT OBJECT, may include detecting an instance of a construction-object 24 with a detector 22. The detector 22 may detect objects that are not considered to be instances of the construction-objects 24, and objects that are instances of the construction-objects 24, i.e. objects that are associated with the construction-zone 20.

Step 120, OBJECT IS LOCALIZATION-OBJECT?, may include determining that the host-vehicle 12 is proximate the construction-zone 20 is in accordance with a determination that a localization-object 54 indicated in the digital-map 48 is not detected by the detector 22. The controller may access the digital-map 48 to determine if the digital-map 48 indicates that there is an instance of a localization-object 54, e.g. a bridge or a building, nearby. The controller 28 may then operate the detector to find the localization-object 54 indicated on the digital-map 48. If the localization-object 54 indicated on the digital-map 48 is not found (i.e. detected) by the detector because, for example, the construction project has removed the localization-object 54, then that may be an indication that the host vehicle is proximate to the construction-zone 20.

Step 125, ACCESS DIGITAL-MAP, may include accessing a digital-map 48 that, for example but not limited to, designates boundaries or a location the construction-zone 20. The digital-map 48 may be stored at the host-vehicle, e.g. in the memory 32, or stored remote from the host-vehicle 12 in the cloud, or a combination mixture thereof. The accessing may be, for example, to look for the presence of an object (e.g. a localization-object 54) that was detected by the detector 22, or to search the area of the digital-map around the present location of the host-vehicle 12 for instances of objects that could be used for localization of the host-vehicle 12. Where to initially search the digital-map may be determined or indicated by a location-detector 56 that receives position signals from satellites 58, as will be recognized by those in the art.

Step 130, OBJECT-LOCATION=MAP-LOCATION?, may include the determining that the host-vehicle 12 is proximate the construction-zone 20, which is in accordance with a determination that an object-location (e.g. global-positioning-system or GPS coordinates) of a localization-object 54 detected by the detector 22 is not located at a map-location of the localization-object 54 indicated in the digital-map 48.

Step 135, OBJECT ASSOCIATED WITH CONSTRUCTION-ZONES?, may include determining if/when an object (i.e. the construction-object 24) is associated with construction-zones 20. The construction-object 24 may be one or more of a construction-sign, a traffic-cone, a barricade, a construction-worker, and construction-equipment.

Step 140, DETERMINING PROXIMITY TO CONSTRUCTION-ZONE, may include determining, in accordance with detecting the construction-object 24 by the detector 22, that the host-vehicle 12 is proximate to a construction-zone 20.

Step 145, HOST-VEHICLE CLOSER THAN A THRESHOLD-DISTANCE?, may include determining that the host-vehicle 12 is proximate the construction-zone is in accordance with a determination that the host-vehicle is closer than a threshold-distance 34 to the construction-zone 20, e.g. the threshold-distance 34 is two-hundred meters (200 m).

Step 150, CHANGE TO MANUAL-MODE, may include changing, in accordance with the determining that the host-vehicle 12 is proximate the construction-zone 20, control of the host-vehicle 12 from the automated-mode 14 to a manual-mode 16.

Accordingly, a system 10 for operating an automated vehicle, a controller 28 for the system 10, and a method 100 of operating the system 10 are provided. The system 10 advantageously has the occupant 18 of the host-vehicle steer or otherwise operate the host-vehicle 12 in or through a construction-zone 20 rather that have the host-vehicle 12 continue to operate in an automated-mode 14 as lane-markings and/or localization-objects 54 normally relied upon for controlling the host-vehicle 12 during operation the automated-mode may not be available or reliable.

While this invention has been described in terms of the preferred embodiments thereof, it is not intended to be so limited, but rather only to the extent set forth in the claims that follow.

We claim:

1. A system for operating an automated vehicle, said system comprising:
   a detector configured to detect construction-objects; and
   a controller-circuit configured to, in accordance with a detection of a construction-object by the detector, determine that a host-vehicle is proximate to a construction-zone, and
   in accordance with a determination that the host-vehicle is proximate the construction-zone, change control of the host-vehicle from an automated-mode characterized by the controller-circuit steering the host-vehicle to a manual-mode characterized by an occupant of the host-vehicle steering the host-vehicle; wherein
   the system includes a digital-map that designates the construction-zone, and wherein
   the determination that the host-vehicle is proximate the construction-zone is in accordance with a determination that a localization-object indicated in the digital-map is not detected by the detector.

2. The system in accordance with claim 1, wherein the determination that the host-vehicle is proximate the construction-zone is in accordance with a determination that the host-vehicle is closer than a threshold-distance to the construction-zone.

3. The system in accordance with claim 2, wherein the threshold-distance is two-hundred meters (200 m).

4. The system in accordance with claim 1, wherein the construction-object is associated with construction-zones.

5. The system in accordance with claim 4, wherein the construction-object is one or more of a construction-sign, a traffic-cone, a barricade, a construction-worker, and construction-equipment.

6. The system in accordance with claim 1, wherein the system includes a receiver configured to receive a construction-broadcast.

7. A method for operating an automated vehicle, said method comprising:
   operating a host-vehicle in an automated-mode, said automated-mode characterized by a controller-circuit steering the host-vehicle;
   detecting a construction-object with a detector;
   determining, in accordance with detecting the construction-object by the detector, that the host-vehicle is proximate to a construction-zone; and
   changing, in accordance with the determining that the host-vehicle is proximate the construction-zone, control of the host-vehicle from the automated-mode to a manual-mode, said manual-mode characterized by an occupant of the host-vehicle steering the host-vehicle, wherein
   the method includes accessing a digital-map that designates the construction-zone, and wherein
   the determination that the host-vehicle is proximate the construction-zone is in accordance with a determination that a localization-object indicated in the digital-map is not detected by the detector.

8. The method in accordance with claim 7, wherein the method includes receiving, by a receiver, a construction-broadcast.

9. The system in accordance with claim 1, wherein the determination that the host-vehicle is proximate the construction-zone is in accordance with a determination that an object-location of a localization-object detected by the detector is not located at a map-location of the localization-object indicated in the digital-map.

10. The system in accordance with claim 1, wherein the digital-map is stored remote from the host-vehicle, and the system includes a transceiver configured to access the digital-map.

11. A controller-circuit for operating an automated vehicle, said controller-circuit comprising:
an input configured to receive a signal from a detector, said detector configured to detect construction-objects; and
a processor configured to, in accordance with a detection of a construction-object by the detector, determine that a host-vehicle is proximate to a construction-zone, and
in accordance with a determination that the host-vehicle is proximate the construction-zone, change control of the host-vehicle from an automated-mode characterized by the controller-circuit steering the host-vehicle to a manual-mode characterized by an occupant of the host-vehicle steering the host-vehicle; wherein
the controller-circuit is configured to access a digital-map that designates the construction-zone, and wherein
the determination that the host-vehicle is proximate the construction-zone is in accordance with a determination that a localization-object indicated in the digital-map is not detected by the detector.

12. The controller-circuit in accordance with claim 11, wherein the determination that the host-vehicle is proximate the construction-zone is in accordance with a determination that the host-vehicle is closer than a threshold-distance to the construction-zone.

13. The method in accordance with claim 7, wherein the digital-map is stored remote from the host-vehicle, and the method includes accessing the digital-map.

14. The controller-circuit in accordance with claim 11, wherein the controller-circuit is configured to receive a construction-broadcast.

15. The method in accordance with claim 7, wherein the determining that the host-vehicle is proximate the construction-zone is in accordance with a determination that an object-location of a localization-object detected by the detector is not located at a map-location of the localization-object indicated in the digital-map.

16. The method in accordance with claim 7, wherein the construction-object is associated with construction-zones.

17. The method in accordance with claim 7, wherein the determining that the host-vehicle is proximate the construction-zone is in accordance with a determination that the host-vehicle is closer than a threshold-distance to the construction-zone.

18. The method in accordance with claim 17, wherein the threshold-distance is two-hundred meters (200 m).

19. The method in accordance with claim 16, wherein the construction-object is one or more of a construction-sign, a traffic-cone, a barricade, a construction-worker, and construction-equipment.

* * * * *